(12) United States Patent
Fujimoto et al.

(10) Patent No.: US 7,302,606 B2
(45) Date of Patent: Nov. 27, 2007

(54) FAULT RECOVERY METHOD AND A STORAGE CONTROLLER IN AN INFORMATION PROCESSING APPARATUS

(75) Inventors: Takeo Fujimoto, Odawara (JP); Hisao Honma, Odawara (JP); Katsuhiro Okumoto, Odawara (JP); Osamu Sakaguchi, Yokohama (JP)

(73) Assignee: Hitachi Software Engineering Co, Ltd., Yokohama (JP)

( * ) Notice: Subject to any disclaimer, the term of this patent is extended or adjusted under 35 U.S.C. 154(b) by 892 days.

(21) Appl. No.: 10/600,828

(22) Filed: Jun. 23, 2003

(65) Prior Publication Data

US 2004/0153691 A1 Aug. 5, 2004

Related U.S. Application Data

(63) Continuation of application No. 09/389,857, filed on Sep. 2, 1999, now abandoned.

(30) Foreign Application Priority Data

Dec. 16, 1998 (JP) .................................. 10-357254

(51) Int. Cl.
*G06F 11/00* (2006.01)
(52) U.S. Cl. .................................. 714/9; 714/4; 714/43
(58) Field of Classification Search .................... 714/4, 714/9, 43
See application file for complete search history.

(56) References Cited

U.S. PATENT DOCUMENTS

| | | | |
|---|---|---|---|
| 3,623,014 A | 11/1971 | Doelz et al. ................... 714/6 |
| 5,155,845 A | 10/1992 | Beal et al. ..................... 714/6 |
| 5,390,326 A | 2/1995 | Shah ............................ 714/55 |
| 5,392,425 A | 2/1995 | Elliott et al. |
| 5,473,752 A | 12/1995 | Beistle et al. .................. 714/4 |
| 5,544,339 A | 8/1996 | Baba ............................. 714/6 |
| 5,572,694 A | 11/1996 | Uchino et al. |
| 5,581,724 A | 12/1996 | Belsan et al. .................. 714/6 |
| 5,638,506 A | 6/1997 | Peterson et al. .............. 714/42 |
| 5,771,367 A | 6/1998 | Beardsley et al. |
| 5,790,775 A | 8/1998 | Marks et al. |
| 5,819,054 A | 10/1998 | Ninomiya et al. |
| 5,835,938 A | 11/1998 | Yamamoto et al. |
| 5,890,219 A | 3/1999 | Scaringella et al. ........... 714/6 |
| 6,032,271 A | 2/2000 | Goodrum et al. ............. 714/56 |
| 6,038,678 A | 3/2000 | Fukushima et al. ............ 714/4 |
| 6,052,795 A | 4/2000 | Murotani et al. |

FOREIGN PATENT DOCUMENTS

WO WO-98-25222 6/1998

OTHER PUBLICATIONS

EP Search Report dated Jun. 12, 2006.

*Primary Examiner*—Michael Maskulinski
(74) *Attorney, Agent, or Firm*—Kenyon & Kenyon LLP

(57) ABSTRACT

In a shared bus connection scheme or an individual path connection scheme, a fault caused at a part of a system affects the same in its entirety. Also, these schemes do not permit the determination of fault locations. Adapters 11, 12 are connected to shared memories 21, 22 with a plurality of individual paths 31 through 38. An address locking unit (not shown) is arranged in each of the shared memories 21, 22 to perform address lock check on memory access operations from the adapters 11, 12. If an address to be accessed is in the locked state, the access is held in the lock wait state until the address is unlocked. The access is made when the address locking is cleared.

9 Claims, 7 Drawing Sheets

| SET VALUE OF EACH BIT OF THE REGISTER | | | | ACCESS PATH |
|---|---|---|---|---|
| A-1 | A-2 | B-1 | B-2 | |
| 0 | 0 | 0 | 0 | PLANE A = DISTRIBUTED PATH, PLANE B = DISTRIBUTED PATH |
| 1 | 0 | 0 | 0 | PLANE A = USES PATH A-1, PLANE B = DISTRIBUTED PATH |
| 0 | 1 | 0 | 0 | PLANE A = USES PATH A-2, PLANE B = DISTRIBUTED PATH |
| 0 | 0 | 1 | 0 | PLANE A = DISTRIBUTED PATH, PLANE B = USES PATH B-1 |
| 0 | 0 | 0 | 1 | PLANE A = DISTRIBUTED PATH, PLANE B = USES PATH B-2 |
| 1 | 0 | 1 | 0 | PLANE A = USES PATH A-1, PLANE B = USES PATH B-1 |
| 1 | 0 | 0 | 1 | PLANE A = USES PATH A-1, PLANE B = USES PATH B-2 |
| 0 | 1 | 1 | 0 | PLANE A = USES PATH A-2, PLANE B = USES PATH B-1 |
| 0 | 1 | 0 | 1 | PLANE A = USES PATH A-2, PLANE B = USES PATH B-2 |

| ACCESS TEST RESULTS | | | | ASSUMED FAULT LOCATION |
|---|---|---|---|---|
| PATH 1A (a) | PATH 1A (b) | PATH 1B (a) | PATH 1B (b) | |
| OK | OK | OK | OK | NO FAULT |
| NG | OK | OK | OK | PATH 1A (a) |
| OK | NG | OK | OK | PATH 1A (b) |
| OK | OK | NG | OK | PATH 1B (a) |
| OK | OK | OK | NG | PATH 1B (b) |
| NG | NG | OK | OK | SHARED MEMORY A |
| NG | OK | NG | OK | FAULT MULTIPLEXED ? (PROCESSOR) |
| NG | OK | OK | NG | FAULT MULTIPLEXED ? (PROCESSOR) |
| OK | NG | NG | OK | FAULT MULTIPLEXED ? (PROCESSOR) |
| OK | NG | OK | NG | FAULT MULTIPLEXED ? (PROCESSOR) |
| OK | OK | NG | NG | SHARED MEMORY B |
| NG | NG | NG | OK | FAULT MULTIPLEXED ? (PROCESSOR) |
| NG | NG | OK | NG | FAULT MULTIPLEXED ? (PROCESSOR) |
| NG | OK | NG | NG | FAULT MULTIPLEXED ? (PROCESSOR) |
| OK | NG | NG | NG | FAULT MULTIPLEXED ? (PROCESSOR) |
| NG | NG | NG | NG | PROCESSOR |

FIG. 7

FAULT RECOVERY METHOD AND A STORAGE CONTROLLER IN AN INFORMATION PROCESSING APPARATUS

This is a continuation of application Ser. No. 09/389,857 filed Sep. 2, 1999 now abandoned, the content of which is incorporated herein by reference in its entirety.

BACKGROUND OF THE INVENTION

The present invention relates generally to a fault recovery method for a storage apparatus of a computer-based information processing system or a computer-based information processing apparatus and is associated with fault detection and fault recovery for ensuring the continuation of a desired operation of the system as a whole even if the storage apparatus, a component of the system, fails. More particularly, the present invention relates to a linking technology for linking a processor with a shared module in a multiprocessor system and a fault tolerance control technology based on the linking technology.

Today, with computer-based information processing systems being in wide use through general society, their faults will result in extremely serious social troubles. On the other hand, as the scale of these systems increases, it is almost impossible to make the systems fault-free. Consequently, it is required for every information processing system to continue as a whole a desired operation even if the system fails partially.

To realize this requirement, Papers of "Information Processing Society of Japan" Vol. 34, No. 11, November, 1993, pp. 1375 to 1384, "Realtime Video Signal Processor And Its Application" (Nobuyuki Yagi), "2.3 Connecting Schemes," "FIG. 3 Processor-to-Processor Connection" proposes information processing system architectures including (a) "Bus" scheme as "shared bus connecting" for connecting system component modules with a shared bus, (d) "Complete" scheme as "individual path connecting" for connecting modules necessary for linking with an individual path, and so on.

Further, Japanese Patent Laid-open No. Hei 9-160723 discloses a double bus connecting scheme, an extended version of the above-mentioned shared bus connecting scheme. This double bus connecting scheme requires a dedicated feature for shared-bus arbitration. In this scheme, if the shared bus itself fails or the bus arbitration feature fails, the entire system is disabled. To solve this problem, a connecting scheme has been proposed in which a plurality of shared buses is further prepared to provide redundancy.

On the other hand, in the individual path connecting scheme, the connecting paths between the processors and the shared modules in a system are independent of each other and therefore the fault of one path will not generally affect the entire system.

SUMMARY OF THE INVENTION

In the shared bus connecting, since the bus signal line of a system is basically time-shared by a plurality of processors and a plurality of component modules, a plurality of signals cannot be sent simultaneously. Therefore, especially with a controller which requires high performance, its bus limitation imposes a system performance bottleneck. In addition, because the shared bus system is a shared resource in a system, the occurrence of a fault inevitably affects the entire system.

In the individual path connecting, there is only one communication path between each processor and a shared module, so that no test by communication path switching can be performed. Consequently, faults of some types disable correct isolation of fault location to ensure the continuous operation of a system.

If, in an attempt to solve this problem, a plurality of individual paths are simply provided between each processor and a shared module in a multiprocessor system having a shared memory, a plurality of access requests generated in a same processor package and an access request generated in each processor are mixed into the shared memory. And, if an access is made to data stored in the same shared memory while the data is being exclusively accessed for read modify write for example, the integrity of the data is destroyed.

It is therefore an object of the present invention to provide, in an information processing apparatus and an information processing system each having multiple processors, a method of connecting a plurality of individual paths capable of ensuring data integrity and a controller based on this connecting method.

In carrying out the invention and according to one aspect thereof, there is provided a multiple individual path connecting method in which two or more connection paths are provided between each processor and each shared module in the system. If a fault is detected, tests are made by switching between the communication paths to totally judge a fault location.

For the plurality of connection paths between each processor and each shared module, access path switching and address locking are provided.

In the address locking, a system shared module such as a shared memory is arranged with an address locking unit to perform exclusive control in a predetermined address range. If a request for access requiring address exclusive control is made, the access address is registered to indicate that the address is in a locked state. When another access request is made to the locked address, the access address is compared with the locked address. If the access address is found matching the locked address, the access is held in a wait state until the address is unlocked and the access is made again after the address locking is cleared, thereby ensuring data integrity.

BRIEF DESCRIPTION OF THE DRAWINGS

These and other objects of the invention will be explained with reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
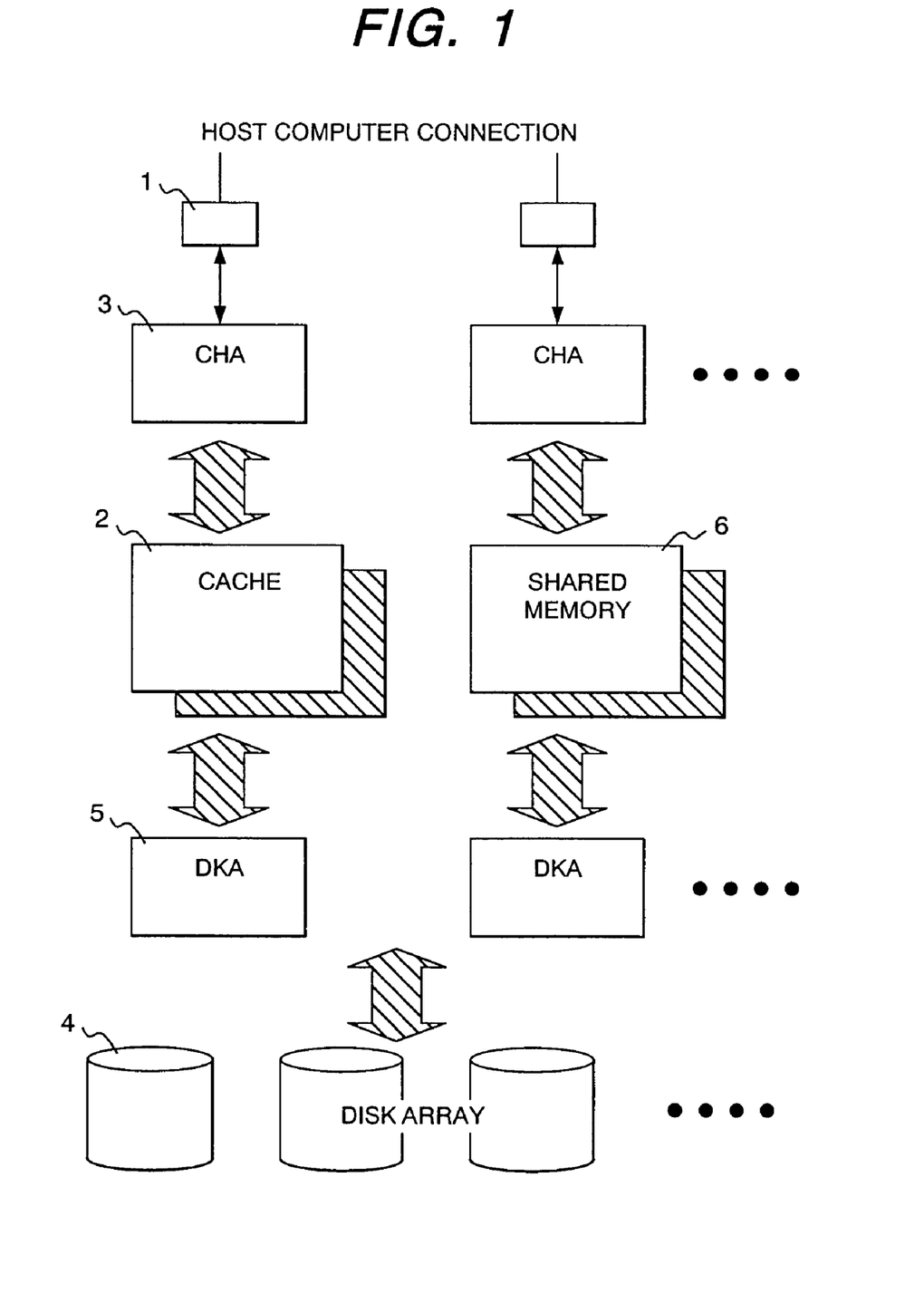
FIG. 1 is a system schematic diagram illustrating an information processing apparatus practiced as one preferred embodiment of the invention.

Now, referring to FIG. 1, there is shown a system schematic diagram illustrating the hierarchy of a storage apparatus practiced as one preferred embodiment. The storage apparatus comprises a channel connection system 1 for connection to a host computer, not shown, which is a higher-level apparatus, a cache memory 2 for temporarily storing input/output data, a channel adapter (hereafter referred to as CHA) for controlling the data transfer between the channel connection system 1 and the cache memory 2, a disk array 4, which is a storage medium for storing data, a disk adapter (hereafter referred to as DKA) for controlling the data transfer between the cache memory 2 and the disk array 4, and a shared memory 6 provided between the CHA 3 and the DKA 5. The shared memory 6 will be detailed later.

FIG. 1 is schematic and therefore does not illustrate detail connections. Actually, the cache memory 2 and the shared memory 6 are connected to one CHA or (DKA). It should be noted that the channel connection system includes, for example, a channel controller in the case of the connection with a mainframe-type host computer (CKD data format) and a SCSI bus controller in the case of the connection with a UNIX-type computer (FBA data format). Alternatively, a controller based on fiber channel may be available.

The shared memory 6 stores control information such as the directory information (a hierarchical table for cache segment search, and the state of each segment) for controlling the use of the cache memory 2, processor-to-processor communication messages (the contents of communication to be executed for the cooperation and synchronization between processors) between the CHA 3 and the DKA 5, system configuration information (the common information associated with the system configuration states such as the mounting states of the CHA 3 and the DKA 5 existing in the system, the storage sizes of the cache memory 2 and the shared memory 6, and the number of disk arrays 4).

The following describes the basic operation of the storage apparatus.

The CHA 3 receives a command from the host computer through the channel connection system 1, interprets the received command, and controls data transfer. The following describes the basic operation to be performed when the CHA 3 receives a read command for data for example from the host computer.

First, the CHA 3 accesses the shared memory 6 to check the cache memory 2 for the data to be read. If the target data is found in the cache memory 2, the CHA 3 transfers this data to the host computer from the cache memory 2 through the channel connection system 1. If the target data is not found, the CHA 3 uses the shared memory 6 to perform processor-to-processor communication with the DKA 5. The DKA 5 transfers the target data from the disk array 4 to the cache memory 2. For the segment for which the data transfer has been completed, the DKA 5 accesses the shared memory 6 again to make communication with the CHA 3, which then controls the data transfer from the cache memory 2 to the host computer.

The CHA 3 and the DKA 5 existing in plurality in the system have each a processor. The connection from each processor to the shared memory 6 is provided independently of each other. In addition, in order to prevent a system operation halt from occurring due to a single fault, the shared memory 6 is also arranged in plural to provide redundancy.

The following describes the connection system between each processor and each shared memory 6.

Figure 2:
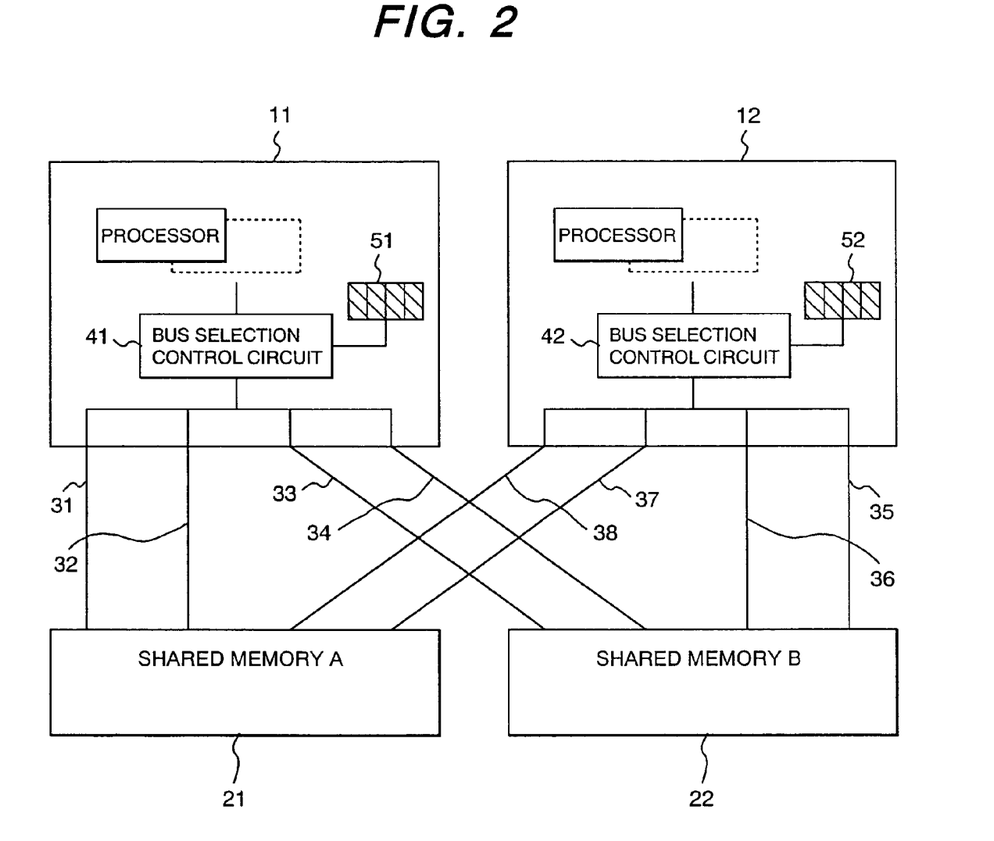
FIG. 2 is a block diagram illustrating main connecting units of the information processing apparatus shown in FIG. 1.

Referring to FIG. 2, there is shown a block diagram illustrating in detail the scheme of the connection with the shared memories. This diagram shows CHAs 11 and 12 (or, with DKAs, sometimes referred to as adapters), which are subsystems having processors, duplicate shared memories 21 and 22, which are peripheral units (shared modules), and access paths 31, 32, 33, 34, 35, 36, 37, and 38 for connecting the CHAs (DKAs) 11 and 12 with the shared memories 21 and 22. Further, the CHAs (DKAs) have path selection control circuits 41 and 42 and path mode setting registers 51 and 52 respectively.

The shared memories 21 and 22 are duplicate and therefore, if one of them fails and then closed down, the system operation can be continued with the other normal shared memory with some degraded performance if any.

Access by the CHA (DKA) 11 for example to the shared memory 21 can be made through both the access path 31 and the access path 32. Thus, two connection paths are provided between each processor and each shared memory, each access path functioning independently of each other, thereby ensuring individual access when the system is normally operating.

The following describes the capabilities of the path selection control circuits 41 and 42.

When access to any shared memory is instructed by a processor, its path selection control circuit 41 or 42 references the content of its path mode setting register 51 or 52 to determine the access path to be used for the instructed access operation. The path mode setting registers 51 and 52 each consist of four bits, which correspond to the four access paths connected to that processor. The path mode setting registers 51 and 52 are programmable; normally, the four bits are all set to "0"s, meaning path automatic distribution. If zero specification can be referenced by the path selection control circuit, a path that was not used by the last access is used preferentially. Consequently, the access load of the shared memory is distributed over the two access paths, thereby enhancing access performance.

If one of the paths is made unavailable by a fault or other causes, the path mode setting registers 51 and 52 are set by program to the path fixed mode. For example, when the two bits corresponding to the shared memory 21 are set to "1" and "0" and the shared memory 21 is accessed, the path selection control circuits 41 and 42 selects in a fixed manner the first access paths (the access path 31 of the CHA 11 or the DKA 11 and the access path 35 of the CHA 12 or the DKA 12).

Figure 3:
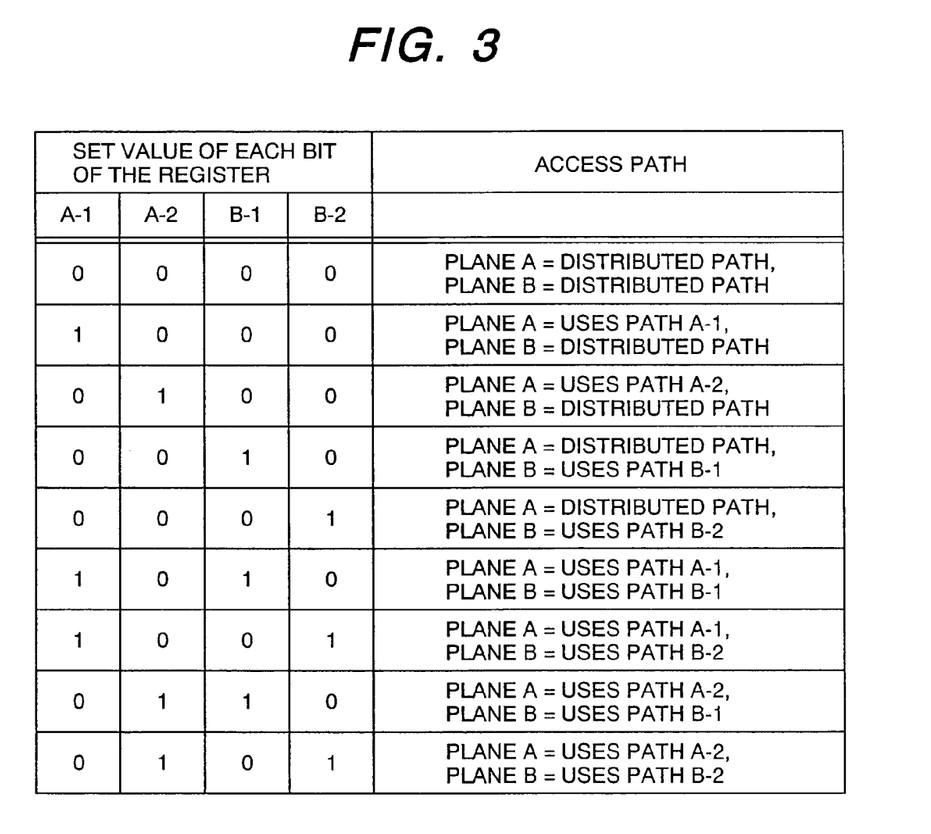
FIG. 3 is a table of combinations of path mode setting register values and access paths to be selected.

Referring to FIG. 3, there are shown the setting values of the path mode registers 51 and 52 and the access paths to be selected for these setting values. "Distributed path" in the figure denotes that a path not used in the last access is selected for load distribution as described above.

Unlike the shared bus connection scheme, each access bus can operate independently of each other. Therefore, access contention for certain data in the shared memory may occur. Especially, if a contention occurs during a read-modify-write operation, data integrity may be destroyed.

The read-modify-write operation denotes reading certain data in the shared memory and writing this data with a specific bit turned on for example. For example, if data to be read for manipulation is rewritten by another write access operation before this data is rewritten, the rewriting is made invalid by a later write operation. Thus, if access exclusive control is not performed through another path during a sequence of operations, data integrity cannot be ensured.

To ensure data integrity, the apparatus according to the invention is provided with an address locking unit in hardware approach. With this address locking unit, when a read-modify-write command comes, an address to be accessed is set in the address locking unit, thereby indicating that this address is in the locked state. When address locking is set, all other memory accesses are checked for address locking. If the address to be accessed is found in the locked state, the memory access concerned waits until the address is unlocked. The memory access concerned is executed after unlocking of that address.

If two or more processors are put in the lock wait state, round robin control operates to prevent lock time-out from occurring.

Figure 4:
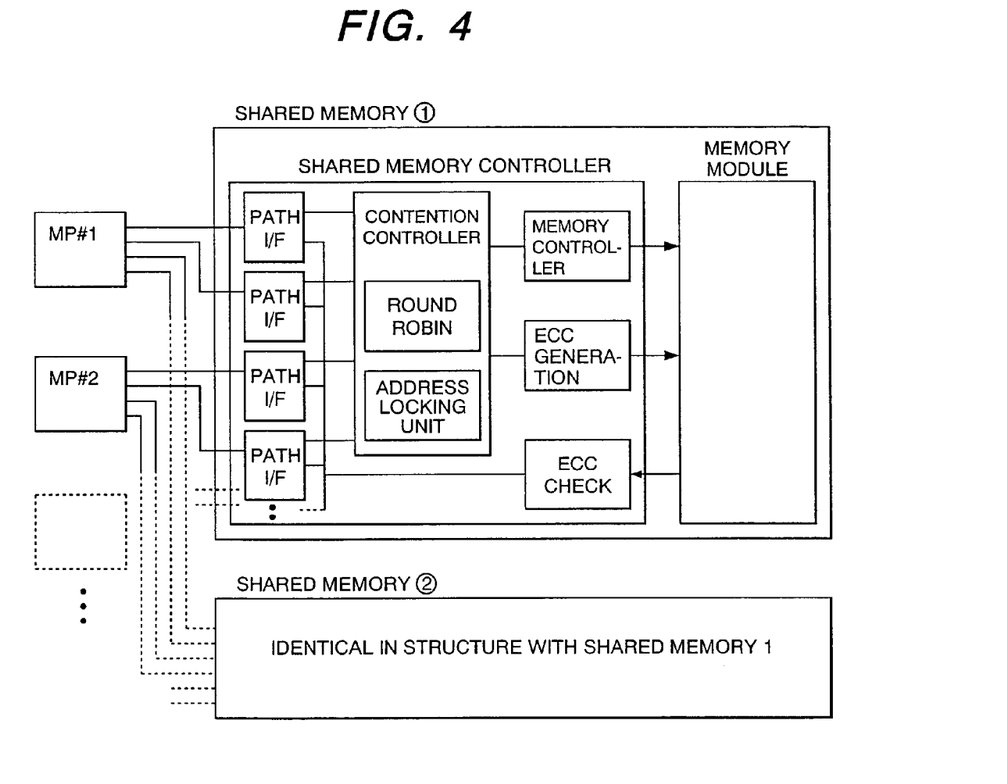
FIG. 4 is a block diagram illustrating a constitution of a shared memory controller.

Referring to FIG. 4, there is shown a block diagram illustrating a constitution of the controller including this address locking unit in the shared memory. It should be noted that, in the figure, a shared memory 1 in FIG. 4 is identical with a shared memory plane A shown in FIG. 2 and a shared memory 2 is identical with a shared memory plane B shown in FIG. 2. The shared memory shown in FIG. 1 is duplexed into shared memory planes A and B.

A shared memory control LSI has a contention controller for controlling the above-mentioned contention, a memory controller, an ECC generator, an ECC checking block, and so on. In a data write operation, the shared memory control LSI generates a check code called ECC (Error Check Condition) and checks ECC integrity in a data read operation, thereby preventing data from being destroyed by memory fault.

Then, in the address locking unit, exclusive control is executed in a predetermined address range. To be more specific, when an access requiring address exclusive control is requested, the address to be accessed is registered to put it in the locked state. Then, when another access requests comes in this state, the address to be accessed is compared with the locked address. If a match is found, this later access request is kept in the wait state until the locked address is unlocked. Thus, data integrity can be retained.

Figure 5:
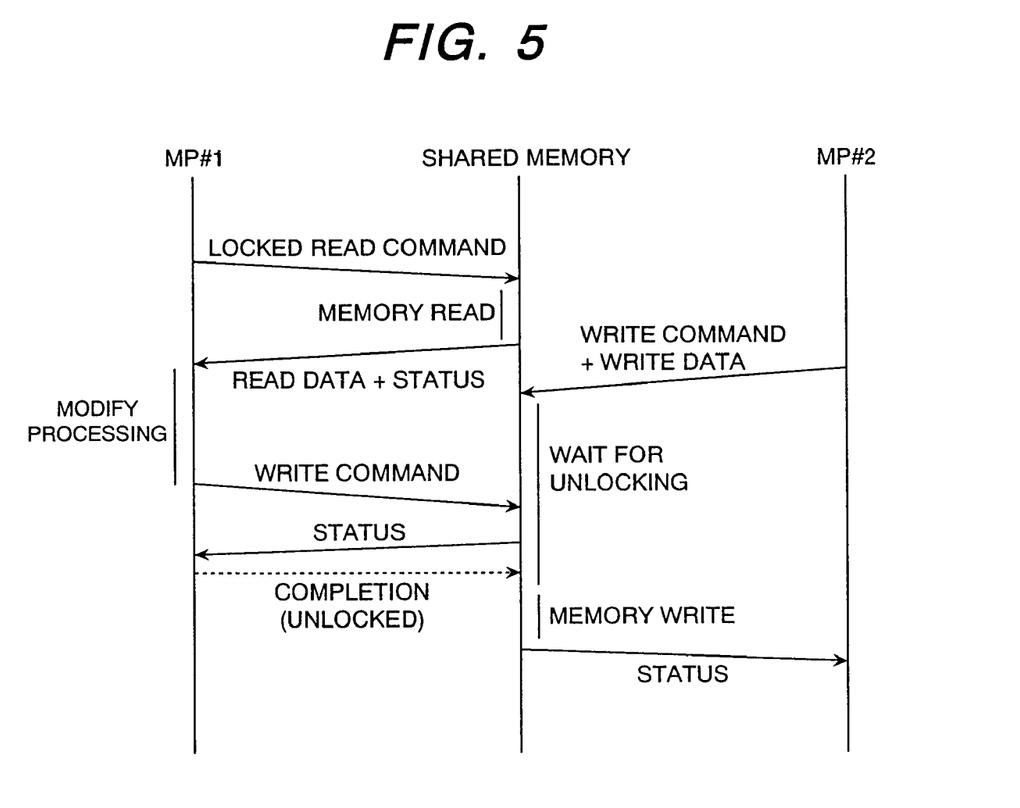
FIG. 5 is a diagram illustrating an address locking method and an exclusive access method.

The shared memory access exclusive scheme based on this address locking is shown in FIG. 5. Here, the processor of MP#1, in order to execute a read-modify-write operation, issues a locked access command. In this case, this command is a locked read command. Receiving the locked read command, the shared memory performs an access path fixing operation to prevent a same address from being accessed through other access paths. Then, the shared memory reads the memory as instructed by the received read command and returns the read data and its status to the MP#1. MP#1 modifies the data and issues a write command to the shared memory. Then, receiving the status from the shared memory, the MP#1 processes it and issues an unlocking command to the shared memory. This unlocking command allows the shared memory to receive access from other paths.

Namely, the processor of the MP#2 attempting to access the same address when the shared memory is in the locked state enters the lock wait state when the access by the MP#1 is in the locked state. When the MP#1 is unlocked, the memory write operation is executed. It should be noted that, in FIG. 5, the MP#1 and the MP#2 denote the processors in any CHAs or DKAs and are identical with those shown in FIG. 2.

The following describes fault tolerant control to be executed if an access error is caused by hardware fault when the processor of the DKA 12 accesses the shared memory 21 through the access path 35.

First, there is a case in which a fault location can be clearly determined from the hardware information present at the fault occurrence. For example, if the fault is now judged located inside the processor of the DKA 12, the DKA 12 is isolated from the system, continuing the system operation by use of the processor of the other DKA. If the fault is judged located inside the shared memory 21 for example from the fault information, the shared memory 21 is isolated from the system, continuing the system operation by use of the shared memory 22.

However, there may be a case in which, with a system consisting of a plurality of hardware configurations, a fault location cannot be cleared identified only from fault information. For example, assume that a time-out error occur during a write access operation to the shared memory 21 by the processor of the DKA 12 through the access path 35 and therefore a normal end be not reported. If this happens, it cannot be clearly determined only from the fact that the time-out error occurred whether a write command has not been sent to the controller of the shared memory 21 due to a fault of the processor in the DKA 12, the normal end has not been reported due to a fault of the shared memory 21, or information has not been normally transmitted due to a fault of the access path 35.

If such a case in which the fault location is ambiguous occurred, the system according to the invention performs an access test in fault processing to totally determine whether the shared memory access through each path is normal or not, thereby identifying the fault location and isolating the identified fault.

To be more specific, if a fault is detected in the DKA 12, access to the shared memory 21 through the access path 35, access to the shared memory 21 through the access path 36, access to the shared memory 22 through the access path 37, and access to the shared memory 22 through the access path 38 are attempted. The fault location is judged based on whether each of these four patterns of access operations has ended normally or not.

For example, if the fault occurred only when accessing the shared memory 21 through the access path 35 and normal access is enabled when accessing the shared memory 21 through the access path 36, it is judged that fault is only on the access path 35. When this determination is made, the access path 35 is put out of use. Thereafter, until the access path 35 is recovered by maintenance job, the DKA 12 accesses the shared memory 21 through the access path 36.

Assume again that the access operations to the shared memory 21 through the access paths 35 and 36 both fail and the shared memory 22 can be normally accessed through the access path 37 and 38. Then, it is judged that the fault is due to the fault of the shared memory 21, upon which the shared memory 21 is blocked. Thereafter, until the shared memory 21 is recovered by maintenance job, each processor does not use the shared memory 21 but uses the shared memory 22 for information transmission and other operations.

Assume further that the access operation to the shared memory 21 through the access paths 35 and 36 and the access operation to the shared memory 22 through the access paths 37 and 38 all fail on all routes. Then, it is judged that the fault location is present around the DKA 12 and therefore the processor concerned is blocked.

Figure 6:
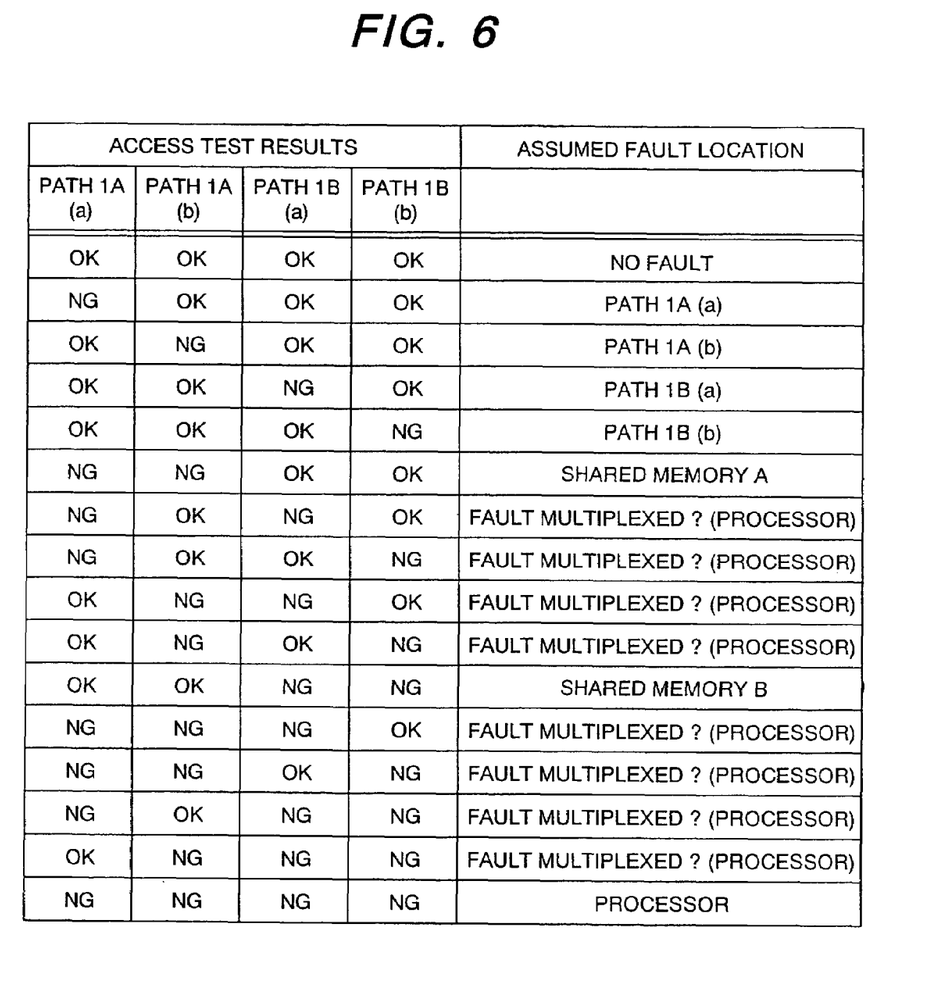
FIG. 6 is a table of combinations of access test results and assumed fault locations.

Referring to FIG. 6, there is shown a table listing combinations of the results of the above-mentioned access tests and assumed fault locations which must be isolated from the system. Paths 1A(*a*), 1A(*b*), 1B(*a*), and 1B(*b*) shown in FIG. 6 correspond to the access paths 31, 32, 33, and 34 for example shown in FIG. 2. In these combinations, in the case of the fault of an access path alone, the fault location can be identified for sure. For the fault of the shared memory or the processor of the CHA or DKA may also be identified in most cases because it is almost impossible for two or more access paths to fail at a time. Namely, arranging these combinations into a table and searching the table from the results of an access test allows a quick identification of a fault location to be blocked for fault recovery.

It should be noted that it is possible to judge whether a fault is on an access path alone or not only by performing an access path test to the same shared memory through another access path before testing all access paths. This is because, if tests on two or more access paths to different shared memories result in no good, a multiple fault is highly possible, which makes fault identification difficult.

Figure 7:
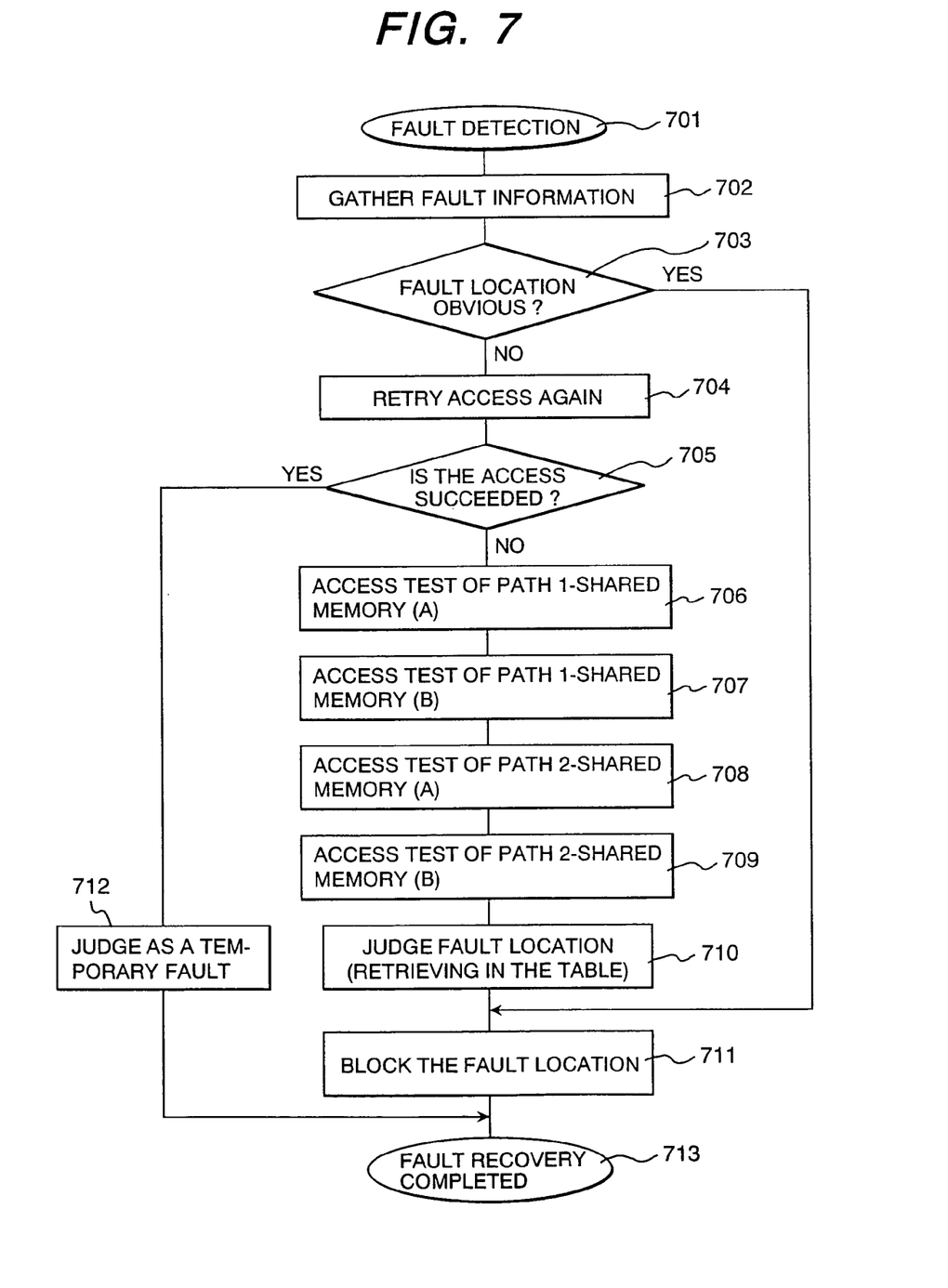
FIG. 7 is a flowchart indicative of fault detection to judge fault location.

Referring to FIG. 7, there is shown a flowchart indicative of the above-mentioned fault identification method.

When a fault is detected (step 701), the information about the detected fault is gathered (step 702). Based on the gathered information, it is judged whether the fault location is obvious or not (step 703). If the fault location is obvious, the fault location is blocked (step 711), thereby completing the fault recovery (step 712).

If the fault location is not obvious, access is retried (step 704) to determine whether the access is successful or not (step 705). If the access is successful, it is judged that the fault is only temporary (step 712), upon which the fault recovery is completed (step 713). If the access is unsuccessful again, an access test is performed on the path 1-shared memory (A) to the path 2-shared memory (B) (for example, the path 1A(*a*) to the path 1B(*b*) shown in FIG. 6) (steps 706 through 709) to judge the fault location with reference to the table shown in FIG. 6 (step 710). Then, the identified fault location is blocked (step 711) to complete the fault recovery (step 712). It should be noted that steps 706 through 709 may not be executed especially sequentially as long as an access path test associated with a fault location is executed.

Unlike the connection scheme based on shared bus, the fault recovery of an access path fault based on the method according to the invention allows to block the fault path without affecting or interrupting the access by other processors within the system.

In the above description of the preferred embodiment of the invention, only the connection between the processor and shared memory in the storage controller has been shown. It will be apparent to those skilled in the art that the present invention is also applicable to the connection to such shared components of the storage apparatus as the cache memory, in addition to the shared memory.

Further, the present invention may also be applied to the connection between the host computer, which is a subsystem, and the storage apparatus, which is a peripheral unit. In this case, the storage apparatus is multiplexed and two connection paths are provided for each host computer and each storage apparatus. When an error is reported, an access test is performed on another path to the same storage apparatus and on a path connected to another storage apparatus. The result of this access test is matched against the table shown in FIG. 3 to judge whether the fault is on the entire storage apparatus or on a connection system such as channel.

As described and according to the invention, problems caused by shared bus connection in an information processing apparatus having multiple processors can be solved. In addition, the present invention can solve problems in identifying fault locations caused at connection in a general individual bus connection scheme. Consequently, the present invention provides the connection means that satisfy both performance and reliability requirements.

Further, the multiple individual path connection scheme makes all the communication paths between the processors and the component modules independent of each other, thereby preventing a single fault from propagating over the entire system. Still further, the plurality of communication paths can operate not in a time division manner but in parallel at a time, thereby solving the problem of performance degradation caused by the shared bus.

While the preferred embodiments of the present invention have been described using specific terms, such description is for illustrative purposes only, and it is to be understood that changes and variations may be made without departing from the spirit or scope of the appended claims.

What is claimed is:

1. A fault tolerant control method for recovery of a fault in a storage apparatus that includes
    a channel connection system for connection to a host apparatus,
    a channel adapter for receiving a command from said host apparatus through said channel connection system,
    another channel connection system for connection to said host apparatus,
    another channel adapter for receiving a command from said host apparatus through said another channel connection system,
    a cache memory, connected to said channel adapter, for temporarily storing data to be sent to said host apparatus,
    another cache memory, connected to said another channel adapter, for temporarily storing data to be sent to said host apparatus,
    a shared memory, connected to said channel adapter, for storing data to control said data stored in said cache memory,
    another shared memory, connected to said another channel adapter, for storing data to control said data stored in said another cache memory, and
    wherein said channel adapter and said shared memory are connected to each other with a first plurality of connecting means, said channel adapter and said another shared memory are connected to each other with a second plurality of connecting means, said another channel adapter and said shared memory are connected to each other with a third plurality of connecting means, and said another channel adapter and said another shared memory are connected to each other with a fourth plurality of connecting means, comprising the steps of, if a fault occurs in access from said channel adapter or said another channel adapter to said shared memory or said another shared memory of said storage apparatus:
    accessing said shared memory or said another shared memory by use of whichever of said connecting means that was not used when said fault was generated;
    determining a fault location from a result of the accessing step; and
    isolating said fault location.

2. The fault tolerant control method as claimed in claim 1, further comprising the steps of, if said fault occurs:
    gathering information about said fault and, if a fault location is obvious, blocking said fault location;

if said fault location is not obvious, retrying said access;
if the said fault occurs again, accessing said shared memory or said another shared memory by use of another connecting means;
determining a fault location by matching a result of the accessing step with a table of fault location determination; and
isolating said fault location.

3. The fault tolerant control method as claimed in claim 1, further comprising the steps of, if said fault occurs in accessing said shared memory:
attempting access of said shared memory from said channel adapter by use of a first one of said first plurality of connecting means;
attempting access of said shared memory from said channel adapter by use of said a second one of said first plurality of connecting means; and
attempting access of said shared memory from said another channel adapter by use of a first one of said third plurality of connecting means.

4. A storage apparatus comprising:
a channel connection system for connection to a host apparatus;
a channel adapter for receiving a command from said host apparatus through said channel connection system;
another channel connection system for connection to said host apparatus;
another channel adapter for receiving a command from said host apparatus through said another channel connection system;
a cache memory, connected to said channel adapter, for temporarily storing data to be sent to said host apparatus;
another cache memory, connected to said another channel adapter, for temporarily storing data to be sent to said host apparatus;
a shared memory, connected to said channel adapter, for storing data to control said data stored in said cache memory;
another shared memory, connected to said another channel adapter, for storing data to control said data stored in said another cache memory;
wherein said channel adapter and said shared memory are connected to each other with a first plurality of connecting means, said channel adapter and said another shared memory are connected to each other with a second plurality of connecting means, said another channel adapter and said shared memory are connected to each other with a third plurality of connecting means, and said another channel adapter and said another shared memory are connected to each other with a fourth plurality of connecting means; and
wherein said channel adapter includes a processor, and if a fault occurs in accessing said shared memory, said processor causes attempted access of said shared memory from said channel adapter by use of a first one of said first plurality of connecting means, access of said shared memory from said channel adapter by use of said a second one of said first plurality of connecting means, and access of said shared memory from said another channel adapter by use of a first one of said third plurality of connecting means, to isolate said fault.

5. A storage apparatus comprising:
a channel connection system for connection to a host apparatus;
a channel adapter for receiving a command from said host apparatus through said channel connection system;
another channel connection system for connection to said host apparatus;
another channel adapter for receiving a command from said host apparatus through said another channel connection system;
a cache memory, connected to said channel adapter, for temporarily storing data to be sent to said host apparatus;
another cache memory, connected to said another channel adapter, for temporarily storing data to be sent to said host apparatus;
a shared memory, connected to said channel adapter, for storing data to control said data stored in said cache memory;
another shared memory, connected to said another channel adapter, for storing data to control said data stored in said another cache memory;
wherein said channel adapter and said shared memory are connected to each other with a first plurality of connecting means, said channel adapter and said another shared memory are connected to each other with a second plurality of connecting means, said another channel adapter and said shared memory are connected to each other with a third plurality of connecting means, and said another channel adapter and said another shared memory are connected to each other with a fourth plurality of connecting means; and
wherein a processor of said channel adapter issues a locked access command to said shared memory when executing certain processing and executes unlocking after completion of said certain processing.

6. A storage apparatus comprising:
a disk array for storing data;
a disk adapter for transferring said data from said disk array to a cache memory;
a channel connection system for connection to a host apparatus;
a channel adapter for receiving a command from said host apparatus through said channel connection system;
another channel connection system for connection to said host apparatus;
another channel adapter for receiving a command from said host apparatus through said another channel connection system;
said cache memory, connected to said channel adapter, for temporarily storing data to be sent to said host apparatus;
another cache memory, connected to said another channel adapter, for temporarily storing data to be sent to said host apparatus;
a shared memory, connected to said channel adapter, for storing data to control said data stored in said cache memory;
another shared memory, connected to said another channel adapter, for storing data to control said data stored in said another cache memory;
wherein said channel adapter and said shared memory are connected to each other with a first plurality of connecting means, said channel adapter and said another shared memory are connected to each other with a second plurality of connecting means, said another channel adapter and said shared memory are connected to each other with a third plurality of connecting means, and said another channel adapter and said another shared memory are connected to each other with a fourth plurality of connecting means;

wherein said shared memory is also connected to said disk adapter with a plurality of connecting means; and wherein a processor of said disk adapter issues a locked access command to said shared memory when executing certain processing and executes unlocking after completion of said certain processing.

7. A storage apparatus comprising:

a disk array for storing data;

a cache memory for temporarily storing data when sending the same to a host apparatus;

a disk adapter for transferring said data from said disk array to said cache memory;

another cache memory for temporarily storing data when sending the same to said host apparatus;

another disk adapter for transferring said data from said disk array to said another cache memory;

a shared memory, connected to said disk adapter, for controlling said data stored in said cache memory;

another shared memory; connected to said another disk adapter, for controlling said data stored in said another cache memory;

wherein said disk adapter and said shared memory are connected to each other with a first plurality of connecting means, said disk adapter and said another shared memory are connected to each other with a second plurality of connecting means, said another disk adapter and said shared memory are connected to each other with a third plurality of connecting means, and said another disk adapter and said another shared memory are connected to each other with a fourth plurality of connecting means; and wherein said disk adapter includes a processor, and if a fault occurs in accessing said shared memory, said processor causes attempted access of said shared memory from said disk adapter by use of a first one of said first plurality of connecting means, access of said shared memory from said disk adapter by use of said a second one of said first plurality of connecting means, and access of said shared memory from said another disk adapter by use of a first one of said third plurality of connecting means, to isolate said fault.

8. A storage apparatus comprising:

a disk array for storing data;

a cache memory for temporarily storing data when sending the same to a host apparatus;

a disk adapter for transferring said data from said disk array to said cache memory;

another cache memory for temporarily storing data when sending the same to said host apparatus;

another disk adapter for transferring said data from said disk array to said another cache memory;

a shared memory, connected to said disk adapter, for controlling said data stored in said cache memory;

another shared memory; connected to said another disk adapter, for controlling said data stored in said another cache memory;

wherein said disk adapter and said shared memory are connected to each other with a first plurality of connecting means, said disk adapter and said another shared memory are connected to each other with a second plurality of connecting means, said another disk adapter and said shared memory are connected to each other with a third plurality of connecting means, and said another disk adapter and said another shared memory are connected to each other with a fourth plurality of connecting means; and wherein a processor of said disk adapter issues a locked access command to said shared memory when executing certain processing and executes unlocking after completion of said certain processing.

9. A storage apparatus comprising:

a disk array for storing data;

a cache memory for temporarily storing data when sending the same to a host apparatus;

a disk adapter for transferring said data from said disk array to said cache memory;

another cache memory for temporarily storing data when sending the same to said host apparatus;

another disk adapter for transferring said data from said disk array to said another cache memory;

a channel connection system for connection to said host apparatus;

a channel adapter for receiving a command from said host apparatus through said channel connection system;

a shared memory, connected to said disk adapter, for controlling said data stored in said cache memory;

another shared memory, connected to said another disk adapter, for controlling said data stored in said another cache memory;

wherein said disk adapter and said shared memory are connected to each other with a first plurality of connecting means, said disk adapter and said another shared memory are connected to each other with a second plurality of connecting means, said another disk adapter and said shared memory are connected to each other with a third plurality of connecting means, and said another disk adapter and said another shared memory are connected to each other with a fourth plurality of connecting means;

wherein said shared memory is also connected to said channel adapter with a plurality of connecting means; and wherein a processor of said channel adapter issues a locked access command to said shared memory when executing certain processing and executes unlocking after completion of said certain processing.

* * * * *

UNITED STATES PATENT AND TRADEMARK OFFICE
CERTIFICATE OF CORRECTION

PATENT NO. : 7,302,606 B2  
APPLICATION NO. : 10/600828  
DATED : November 27, 2007  
INVENTOR(S) : Takeo Fujimoto et al.

Page 1 of 1

It is certified that error appears in the above-identified patent and that said Letters Patent is hereby corrected as shown below:

Title Page:

Item (73) Assignee: should read as follows:

Hitachi, Ltd., Tokyo (JP); and Hitachi Software Engineering Co., Ltd., Yokohama (JP).

Signed and Sealed this

Fifteenth Day of December, 2009

David J. Kappos
*Director of the United States Patent and Trademark Office*